O. M. SUMMERS.
SHOCK ABSORBER.
APPLICATION FILED APR. 22, 1919.
1,335,138. Patented Mar. 30, 1920.
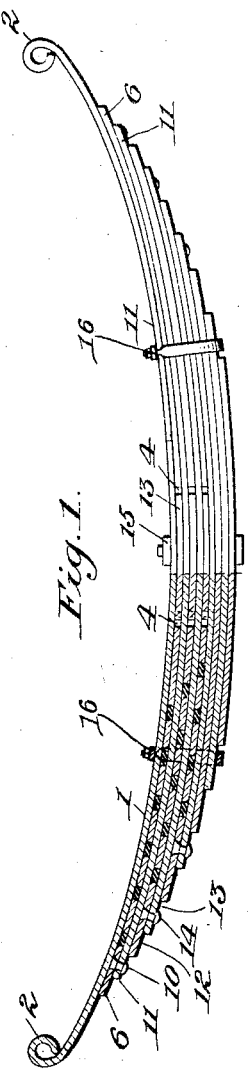
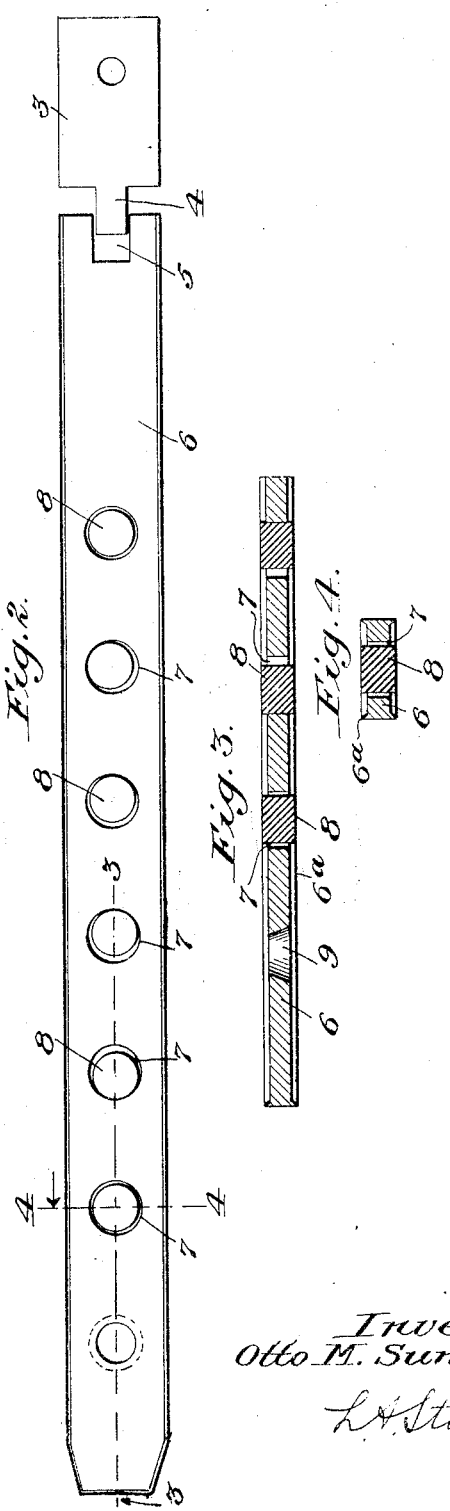
Inventor:
Otto M. Summers,
L. H. Stanley
Att'y.

UNITED STATES PATENT OFFICE.

OTTO M. SUMMERS, OF GLASGOW, KENTUCKY.

SHOCK-ABSORBER.

1,335,138.

Specification of Letters Patent.  Patented Mar. 30, 1920.

Application filed April 22, 1919. Serial No. 291,853.

*To all whom it may concern:*

Be it known that I, OTTO M. SUMMERS, a citizen of the United States of America, residing at Glasgow, in the county of Barren and State of Kentucky, have invented certain new and useful Improvements in Shock-Absorbers, of which the following is a specification.

My invention relates to improvements in shock absorbers, and it consists in the combinations, constructions and arrangements herein described and claimed.

An object of my invention is to provide a shock absorber which is built-in and forms a unitary part of a set of springs such as the semi-elliptical springs in common use on automobiles, carriages, etc.

A further object of my invention is to provide a built-in shock absorber which obviates the necessity of auxiliary devices that are unsightly and that, moreover, are liable to get out of order.

A further object of my invention is to provide a built-in shock absorber in which friction devices are brought into play successively as the springs are flexed, thus automatically compensating for the force of the shock in proportion to the force.

A further object of my invention is to provide a device which is relatively simple in construction and operation and which is cheap to manufacture.

Other objects and advantages will appear in the following specification, and the novel features of the invention will be particularly pointed out in the appended claims.

My invention is illustrated in the accompanying drawings, forming part of this application, in which:

Figure 1 is a front view of a set of semi-elliptical springs equipped with my built-in shock absorber, a portion of the view being in section;

Fig. 2 is a plan view of one of the shock absorber leaves;

Fig. 3 is a section along the line 3—3 of Fig. 2; and

Fig. 4 is a section along the line 4—4 of Fig. 2.

In the drawings I have illustrated the built-in shock absorber as being applied to a set of springs of the semi-elliptical type, but this is for the purpose of illustration only since it will be understood that leaf springs of various types might be used without departing from the spirit of the invention.

In Fig. 1, the upper leaf 1 is extended in the usual manner and is looped at 2 to form the spring eye which may be secured to any suitable part of the vehicle. Adjacent to the leaf 1 at the center thereof is a spacing plate or leaf 3, a portion of which is shown in Fig. 2 having at each end a tongue 4 arranged to enter a slot 5 in a shock absorber leaf 6 at each end of the block. These shock absorber leaves 6 are provided with a series of openings 7 and in each opening is disposed a plug or disk, preferably made of a soft and tough steel, for the purpose of creating friction, as will be explained later. It will be noted that the openings 7 are larger than the disks, which are shown in the openings in Fig. 2 at 8. Near the end of the shock absorber leaf 6 is a tapered opening 9 and a rivet 10 is disposed in said opening and rivets the end of the shock absorber leaf to the next adjacent spring leaf 11. The rivet 10 performs the function of a driving lug. As will be seen from Figs. 2, 3 and 4, the ends and sides on the shock absorber leaf 6 are upset or expanded as shown at 6$^a$. The plugs or disks 8 are thicker than the shock absorber leaf which holds them so as to insure frictional contact with the spring leaves proper. In the drawings I have purposely exaggerated this difference in thickness in order to bring out the fact that the disks or plugs 8 are of a thickness which is equal to the thickness of the expanded edges of the shock absorber leaf, as will be clearly seen from Figs. 3 and 4.

Adjacent to the spring leaf 11 is another shock absorber leaf 12 which is similar to the leaf 6 and which is secured to the adjacent spring leaf 13 by means of a rivet 14 which is similar to the rivet 10 and which has also the same functions. Other shock absorber leaves may be inserted between the spring leaves, as may be desired. The whole set of leaves and spacing blocks or plates, similar to the plate 3, may be secured together in any suitable manner such as by a bolt 15, while retaining members 16 are also provided as clearly shown in the drawings.

From the foregoing description of the various parts of the device, the operation thereof may be readily understood. The load is carried on the ends of the springs, while the center of the latter rests on and is fastened to the axle (not shown). When the wheel strikes an obstruction and the axle is quickly thrown upward, the spring is of course partially straightened and this increases the distance between the driving lug 10 and the end of the tongue 4. As the lug 10 goes down and away from the tongue 4 it will drag the shock absorber leaf outwardly with it, that is to say away from the tongue 4. The friction plugs 8 will not move until the one nearest the tongue 4 is engaged by the side of its opening, whereupon further movement will cause the friction plug to exert friction on the spring leaves on each side. Further movement will bring the next opening against its plug which will exert friction in the same manner, and so on successively toward the outer end of the shock absorber leaf. The fact that the openings for the plugs are larger than the plugs themselves gives the leaf a chance to move at first without exerting friction. Thus, in riding on smooth roads where the spring leaves are flexed only to a small extent, the plugs do not come into frictional play, and this permits easy riding on smooth roads. When, however, a small obstruction is encountered and the springs are depressed far enough, then the friction plugs come into play, as stated. This gives a velvety action which, as far as I am aware, has never been approached by any shock absorbing device.

The space around the plugs is filled with a tough cleaving grease, and this is held in place by the upturned edges 6ª. The latter also tends to prevent sand and dirt from working in as well as keeping the grease from working out. As has been stated above, with the construction described friction comes on one plug at a time, gradually increasing until the maximum depression is reached, while on the rebound it tapers off in the reverse order and this prevents the wheel from being lifted from the ground.

I claim:

1. A shock absorber comprising a plurality of spring leaves secured together, a shock absorber leaf disposed between adjacent spring leaves, a plurality of friction devices carried by said shock absorber leaf, and relatively movable with respect to the adjacent spring leaves and to the shock absorber leaf by which they are carried.

2. A shock absorber comprising a plurality of spring leaves secured together, a shock absorber leaf disposed between adjacent spring leaves, said shock absorber leaf being secured to one of said spring leaves and being movable relatively to the adjacent spring leaf, and a plurality of friction devices carried by said shock absorber leaf.

3. A shock absorber comprising a plurality of spring leaves secured together, a shock absorber leaf disposed between adjacent spring leaves, and being provided with a series of openings, and a friction device disposed in each of said openings and arranged to engage the spring leaves on each side of said shock absorber leaf.

4. A shock absorber, comprising a plurality of spring leaves secured together, a shock absorber leaf disposed between adjacent spring leaves and being provided with a series of openings, and a friction device disposed in each of said openings and arranged to engage the spring leaves on each side of said shock absorber leaf, each of said friction devices being smaller than its opening and being movable with respect to the shock absorber leaf.

5. A shock absorber, comprising a plurality of spring leaves, spacing plates disposed between adjacent spring leaves, said spring leaves and said spacing plates being secured together, a shock absorber leaf disposed between adjacent spring leaves, said shock absorber leaf having a plurality of openings, and friction plugs carried in said openings and adapted to frictionally engage the spring leaves on either side thereof.

6. A shock absorber, comprising a plurality of spring leaves, spacing plates disposed between adjacent spring leaves, said spring leaves and said spacing plates being secured together, a shock absorber leaf disposed between adjacent spring leaves, said shock absorber leaf having a plurality of openings, friction plugs carried in said openings and adapted to frictionally engage the spring leaves on either side thereof, and means for securing the end of each shock absorber leaf to one of the adjacent spring leaves.

7. A shock absorber, comprising a plurality of spring leaves secured together, a shock absorber leaf disposed between adjacent spring leaves, said shock absorber leaf having a plurality of openings, a friction device disposed in each opening, each of said friction devices being of a greater thickness than the body portion of the shock absorber leaf, and the edges of the shock absorber leaf being upset or expanded to the same thickness of the friction device.

8. A shock absorber, comprising a plurality of spring leaves secured together, a shock absorber leaf disposed bewteen adjacent spring leaves, said shock absorber leaf having a plurality of openings, a friction device disposed in each opening, each of said friction devices being of a greater thickness than the body portion of the shock absorber leaf, and the edges of the shock absorber leaf being upset or expanded to the same thickness of the friction devices, and a lubricant carried by said shock absorber leaf between the expanded edges thereof.

In testimony whereof I affix my signature.

OTTO M. SUMMERS.